United States Patent
Svensson et al.

(10) Patent No.: US 9,592,812 B2
(45) Date of Patent: Mar. 14, 2017

(54) METHOD FOR OPERATING AN ELECTROMECHANICAL VEHICLE BRAKE SYSTEM

(71) Applicant: FORD GLOBAL TECHNOLOGIES, LLC, Dearborn, MI (US)

(72) Inventors: Thomas Svensson, Leichlingen (DE); Tim Jurkiw, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/738,676

(22) Filed: Jun. 12, 2015

(65) Prior Publication Data
US 2015/0360663 A1 Dec. 17, 2015

(30) Foreign Application Priority Data
Jun. 13, 2014 (DE) .................. 10 2014 211 377

(51) Int. Cl.
| | | |
|---|---|---|
| *B60T 7/00* | (2006.01) | |
| *B60T 7/22* | (2006.01) | |
| *B60T 8/00* | (2006.01) | |
| *B60T 13/00* | (2006.01) | |
| *B60T 13/74* | (2006.01) | |
| *B60T 8/171* | (2006.01) | |
| *B60T 8/32* | (2006.01) | |

(Continued)

(52) U.S. Cl.
CPC .............. *B60T 13/745* (2013.01); *B60T 7/22* (2013.01); *B60T 8/171* (2013.01); *B60T 8/172* (2013.01); *B60T 8/3255* (2013.01); *B60T 8/3275* (2013.01); *B60T 8/4872* (2013.01); *B60T 2201/10* (2013.01); *B60T 2201/12* (2013.01); *B60T 2210/14* (2013.01)

(58) Field of Classification Search
CPC combination set(s) only.
See application file for complete search history.

(56) References Cited

U.S. PATENT DOCUMENTS

| | | |
|---|---|---|
| 5,614,788 A | 3/1997 | Mullins |
| 6,059,380 A | 5/2000 | Pueschel |
| 6,082,830 A | 7/2000 | Volz |

(Continued)

FOREIGN PATENT DOCUMENTS

| | | |
|---|---|---|
| DE | 196 15 449 B4 | 10/1997 |
| DE | 10 2007 049 516 A1 | 4/2008 |

(Continued)

OTHER PUBLICATIONS

Examination Report dated Jan. 28, 2015 issued in related German Application No. 10 2014 211 377.6.

(Continued)

*Primary Examiner* — Yonel Beaulieu
(74) *Attorney, Agent, or Firm* — Jones Robb, PLLC; Raymond L. Coppiellie

(57) ABSTRACT

A method for operating an electromechanical vehicle brake system is provided. The method includes determining that an activation condition has been met, selecting a pre-charge pressure based at least in part on the activation condition, building up at least an initial portion of the pre-charge pressure in the brake system, and applying at least the initial portion of the pre-charge pressure to at least one wheel brake.

30 Claims, 3 Drawing Sheets

(51) Int. Cl.
*B60T 8/172* (2006.01)
*B60T 8/48* (2006.01)

(56) References Cited

U.S. PATENT DOCUMENTS

| | | |
|---|---|---|
| 6,203,116 B1 | 3/2001 | Dieckmann |
| 6,499,812 B1 | 12/2002 | Gronau |
| 7,866,761 B2 | 1/2011 | Gerum |
| 8,271,172 B2 | 9/2012 | Heller |
| 8,770,673 B2 | 7/2014 | Wuerth |
| 2002/0153767 A1 | 10/2002 | Pasterkamp |
| 2003/0234576 A1* | 12/2003 | Reuter .................. B60T 8/4881 303/146 |
| 2008/0175736 A1 | 7/2008 | Choi |
| 2009/0314256 A1 | 12/2009 | Bland |
| 2010/0010716 A1* | 1/2010 | Sawada ................ B60W 10/06 701/52 |
| 2010/0213757 A1 | 8/2010 | Wagner |
| 2011/0248560 A1 | 10/2011 | Vollert |
| 2012/0255817 A1 | 10/2012 | Vollert |
| 2013/0338894 A1* | 12/2013 | Olofsson ................ B60T 7/042 701/70 |
| 2014/0058641 A1 | 2/2014 | Theel |
| 2016/0031423 A1 | 2/2016 | Ishida |

FOREIGN PATENT DOCUMENTS

| | | |
|---|---|---|
| DE | 10 2008 054 856 A1 | 7/2010 |
| DE | 10 2009 028 010 B3 | 1/2011 |
| DE | 10 2013 222 880 A1 | 5/2014 |
| EP | 2 409 885 A1 | 1/2012 |

OTHER PUBLICATIONS

Examination Report dated Feb. 18, 2015 issued in related German Application No. 10 2014 211 378.4.
Examination Report dated Mar. 12, 2015 issued in related German Application No. 10 2014 211 380.6.
Non-Final Office Action dated Jan. 3, 2016 in U.S. Appl. No. 14/738,692.
Response Filed on Jan. 6, 2016 in U.S. Appl. No. 14/738,692.
Non-Final Office Action dated Mar. 24, 2016 in U.S. Appl. No. 14/738,687.
Response Filed on Jun. 24, 2016 in U.S. Appl. No. 14/738,687.
Notice of Allowance dated Aug. 31, 2016, in co-pending U.S. Appl. No. 14/738,687.
Notice of Allowance dated Aug. 30, 2016, in co-pending U.S. Appl. No. 14/738,692.

* cited by examiner

METHOD FOR OPERATING AN ELECTROMECHANICAL VEHICLE BRAKE SYSTEM

CROSS REFERENCE TO RELATED APPLICATIONS

This application claims priority to German Application No. 10 2014 211 377.6, filed on Jun. 13, 2014, the entire content of which is incorporated by reference herein.

This application is related to U.S. patent application Ser. No. 14/738,687, filed Jun. 12, 2015, which claims priority to German Application No. 10 2014 211 378.4, filed on Jun. 13, 2014. This application also is related to U.S. patent application Ser. No. 14/738,692, filed Jun. 12, 2015, which claims priority to German Application No. 10 2014 211 380.6, filed on Jun. 13, 2014. The entirety of the contents of each of these related applications is incorporated herein by reference.

TECHNICAL FIELD

The present disclosure relates generally to an electromechanical brake system and a method for operating the electromechanical brake system, and more particularly, to an electromechanical brake system and operation of the same in a motor vehicle.

BACKGROUND

Customary brake force boosters operate with an evacuated volume. In this context, the difference between the negative pressure of the vacuum and the pressure of the atmosphere is utilized to generate a boosting force. This serves to increase the activation force which is applied by means of (human) muscles, with the result that the actual braking force is composed of the sum of the activation force and boosting force. In contrast, electromechanical brake systems operate without a vacuum. In this context, the brake pressure is generated exclusively by one or more electric motors. A mechanical connection between the brake pedal and the wheel brake or brakes is therefore not present in this system. The resistance perceived by a user, for example at the brake pedal, is generated by the system in the form of feedback.

The connection, composed of electronic and usually hydraulic components, introduces a certain degree of inertia into the response behavior of such electromechanical brake systems. In other words, the systems require their own reaction time between the deceleration request and the actual occurrence of the triggered braking process.

In view of the required reaction time, there is room for improvements in electromechanical brake systems.

SUMMARY

In accordance with various exemplary embodiments of the present disclosure, a method for operating an electromechanical vehicle brake system is provided. The method includes determining that an activation condition has been met, selecting a pre-charge pressure based at least in part on the activation condition, building up at least an initial portion of the pre-charge pressure in the brake system, and applying at least the initial portion of the pre-charge pressure to at least one wheel brake.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
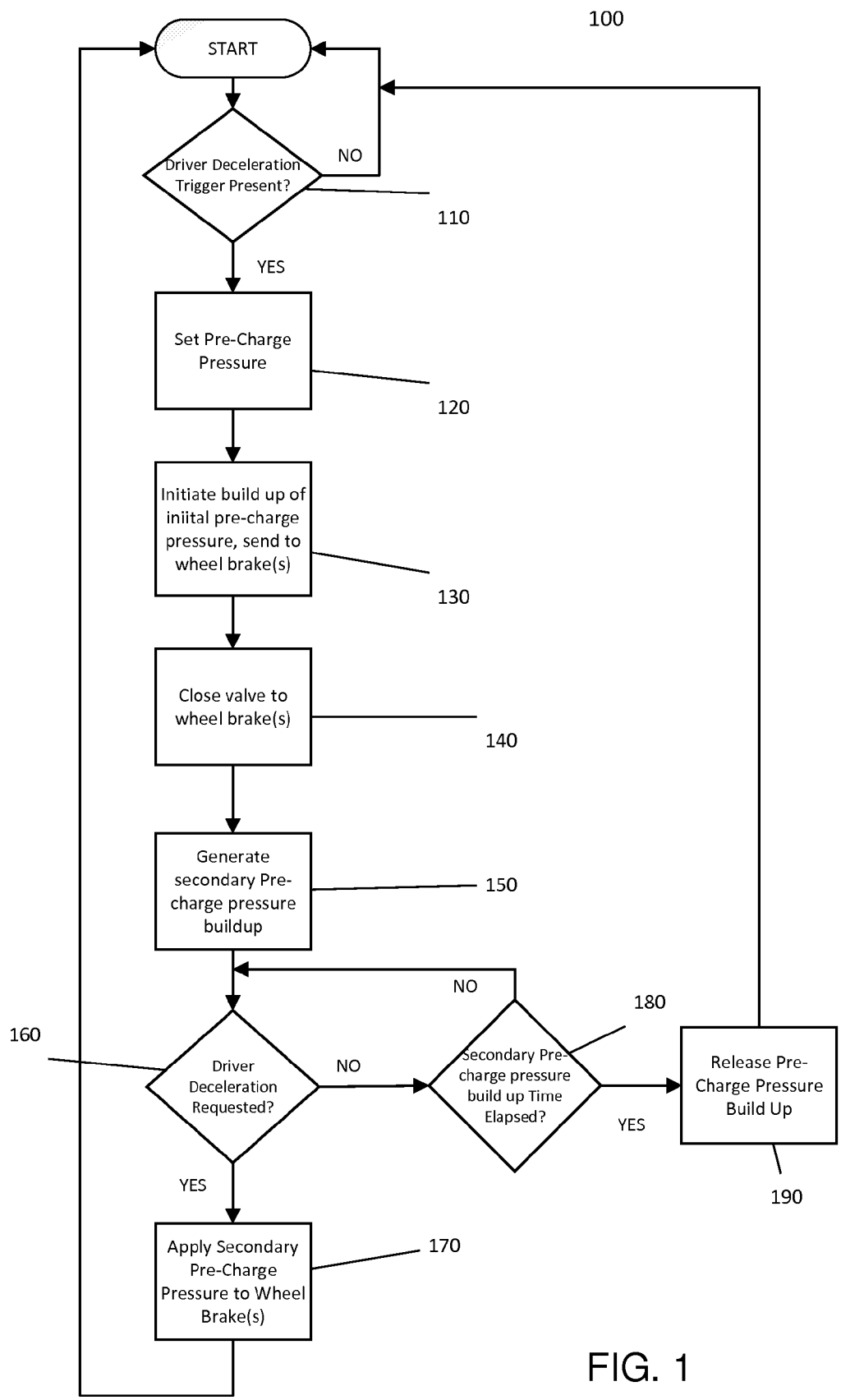
FIG. 1 is a flowchart illustrating a first exemplary embodiment of a method of operating a brake system in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, the present disclosure is directed to developing a method for operating an electromechanical brake system for a vehicle. The method improves the response of and power provided by the electromechanical brake system in the case of a deceleration request triggered by the person controlling the vehicle or an autonomous system in the case of an automatically carried-out vehicle control process.

In accordance with the disclosed method, a temporary pre-charge pressure is built up in at least part of the vehicle brake system in advance of a possible braking request. A pre-charge pressure can mean a buildup of pressure in at least one region of the hydraulic part of the vehicle brake system. In this context, the pre-charge pressure is not continuously directly present from the start during the operating period of the vehicle but rather is only built up on the basis of a triggering factor.

In accordance with the present disclosure, the pre-charge pressure which is built up in anticipation of a braking event, for example by means of an electric motor coupled to a pump device, is passed on to at least one of the wheel brakes of the vehicle brake system while the braking process is occurring. The pre-charge pressure can either be output entirely or only partially to the wheel brake. Additionally or alternatively, the pre-charge pressure can be supplemented by an additional pressure which is at least partially dependent on the intensity of the braking process. In this context, the achieved sum of the pressures comprising the pre-charge pressure and the additional pressure is at least partially output in the necessary level to the at least one wheel brake. The number of wheel brakes which are activated in this way and/or generally present can depend, for example, on the respective type of vehicle. Possible vehicles here would be, for example, single-track vehicles such as, for example, two-wheeled vehicles or multi-track vehicles such as, for example, automobiles.

When operated in this way, electromechanical vehicle brake systems show improved power output. The pre-charge pressure which is built up on the basis of one triggering factor or various triggering factors brings about a significant reduction in the reaction time of such a brake system. In particular, the present method provides a sufficiently high brake pressure before a potential braking process. When the expected braking process then actually occurs, the brake pressure can then be utilized either completely or only to the required level in order to act directly on the wheel brake. In this manner, the system is prepared for and capable of discharging a significantly faster fluid flow to the at least one wheel brake. In this regard, the reaction time of known electromechanical vehicle brake systems can, in an ideal case, be reduced to approximately zero.

The improvement in power which can be achieved in this way is above the current level of the reaction capability of vacuum-based conventional brake systems. This is independent of whether these brake systems are activated through user/manual activation and/or autonomous systems. The method of the present disclosure is a type of function which can run in parallel with or in combination with already existing control functions. In this way, for example, already existing vehicles can be directly retrofitted insofar as they have hardware which can be correspondingly activated. Of course, it is also possible to retrofit vehicles which firstly have to be equipped with corresponding hardware in order to carry out the method presented here.

The actual triggering factor or factors for building up the pre-charge pressure can be found wherever there may be evidence of a possibly imminent braking process. Accordingly, a triggering factor can basically be understood to be all indicators which permit a prediction which turns in this direction. Since the improvement in power which can be achieved by the present disclosure affects a plurality of regions, the possible triggering factors for such operation of an electromechanical vehicle brake system are correspondingly varied.

According to one aspect of the present disclosure, a first triggering factor may include using the type of activation of the respective control element for regulating the engine power as an indication of a possibly imminent braking process. Even if the control element can be, for example, a gas cock or an auxiliary device of some other type, the measure here is explained below using the example of a foot pedal; or more precisely an accelerator pedal.

The method of manually releasing the throttle by the person who is controlling the vehicle, by lifting off their foot off the pedal for example, can therefore be used as a basis for inferring a possibly immediately imminent braking process. This indication may involve, for example, a fast release of the accelerator pedal. This is, of course, necessary whenever the right foot which typically operates the accelerator pedal is to be removed from the accelerator pedal as quickly as possible and placed on the brake pedal in order to brake the vehicle.

In practice, the first triggering factor can be defined on the basis of an available rate of change of the accelerator pedal input signal or else by an internal calculation of the quick release of the accelerator pedal. Expressed as a function this could be, for example, as follows:

```
Acc_ped_rate_of_change =
        abs ( ( Acc_ped_pos_current − Acc_ped_pos_prev ) /
        sample_time )
IF      Acc_ped_rate_of_change ≥ Acc_ped_rate_thresh
        Acc_ped_quick_release = 1
ELSE
        Acc_ped_quick_release = 0
ENDIF
```

In this context, "Acc_ped_rate_of_change" stands for the rate of change of the accelerator pedal, while "Acc_ped_pos_current" stands for the current position of the accelerator pedal and "Acc_ped_pos_prev" stands for the previous position of the accelerator pedal. The respective observation time period for this is input as "sample_time" and "Acc_ped_rate_thresh" stands for a threshold value representing a rate of change which is evaluated as a quick release of the accelerator pedal for the initiation of a braking process. Finally, the expression "Acc_ped_quick_release" includes either the value "0" or "1" as a result of whether a quick release of the accelerator pedal is present in the sense of an imminent braking process or not. In this context, the result "0" does not bring about any action at all, while "1" serves as a triggering factor for the buildup of the pre-charge pressure.

Finally, the function specified here serves for the filtering of the movements of the accelerator pedal such that a release of the accelerator pedal can be evaluated as a start of the subsequent activation of the vehicle brake. In fact, this filtering can be set in an extremely sensitive way since the buildup of the pre-charge pressure is a preventive measure which initially has no direct effect at all on the vehicle brakes. Instead, the resultant improvement in braking time provided by this function should be such the threshold can be set relatively low so that a braking process which is actually imminent is detected in all cases.

In order to be able to set the sensitivity with respect to the activation by means of this function, the value "Acc_ped_rate_thresh" can preferably be settable. Furthermore, the filtering could be carried out in such a way that the rate of change is calculated over a relatively long time period in order thereby to reduce the effects of the switching over or of any signal errors.

The function can therefore have, for example, a learning component or can even be embodied itself as a learning function. For this purpose, the rates of change, to be more precise the respective release of the accelerator pedal, can be observed over a relatively long time period in such a way that the conclusion that a braking process is actually imminent achieves a higher level of accuracy. The objective here is the gradual changing of the value which is responsible for the sensitivity of the activation of the function. The wider the basis for this value by means of the learning character of the function, the more accurate or smoother the adaptation thereof is.

Possible signal errors of the input signals which are relevant for the function can be mainly from the position signal of the accelerator pedal which measures the respective release rate of the accelerator pedal. This can have, under certain circumstances, an undesired offset and accuracy problems at specific times and with respect to the release rate of the accelerator pedal. The influence thereof can be correspondingly alleviated or even eliminated by the previously described learning character of the function.

Of course, the position of the accelerator pedal and/or the rate of change can also be rounded up to an upper and/or lower limit in order to make available an additional measure for input filtering.

According to another aspect of the present disclosure, a signal of a detection device can be used as a second triggering factor for the buildup of the pre-charge pressure. This can be, for example, a detection device for detecting objects such as is present in a collision warning device of the vehicle. Such devices are usually optical systems for the detection of the surroundings which may include, for example, an optical sensor such as, for example, a camera and/or a radar system. These devices also may include all further sensor types which serve to detect physical obstacles.

When a relevant object is detected by means of the detection device, the signal, which is available to the vehicle or brake control systems without the involvement of the controlling person (e.g., driver), can be used to initiate buildup of the pre-charge pressure. In some cases, the brake system can be placed in the state of readiness according to the disclosure far in advance of a necessary braking maneuver for alleviating a collision or emergency braking, in order to be able to access a sufficiently high brake pressure directly. As a result of the foresight with respect to a possible braking maneuver, there is generally a sufficiently long time period for the buildup of the respectively necessary pre-charge pressure. In combination with a vehicle-side collision warning device, there is a high-performance brake system whose safety can be significantly increased by operation using the method disclosed herein.

The disclosed method also is for the combination with an automatic parking system. Such systems may be, for example, a fully automatic and/or a remote-controlled parking system. In this context, when the automatic parking process of the vehicle is initiated it is possible to use the undershooting of a settable or defined value for the ambient temperature as a third triggering factor. The background to this is the naturally higher viscosity of the brake fluid present in the hydraulic part of the brake system at relatively low temperatures. In particular, during the winter months, the colder ambient temperatures require an increased brake pressure to provide the required braking force.

According to the present disclosure, the value of the current ambient temperature which is, for example, measured or made available by means of an already existing module or sensor of the vehicle, can be used generally to determine the variable level of the respective pre-charge pressure.

In conjunction with automatic parking systems, in some cases small distances are used to carry out the parking maneuver (i.e., the space available for parking is minimal). In such cases, it is desirable that the reaction time between the deceleration request and the actual implementation is as short as possible. As explained above, this is not necessarily the case in particular at low temperatures. The present disclosure teaches that the more viscous brake fluid should be compensated for.

It should be understood that the present teachings are not limited to the use of the current ambient temperature but also includes, for example, the actual temperature of the brake fluid. The actual temperature of the brake fluid has been empirically found to deviate, under certain circumstances, from the ambient temperature, with the result that this difference can also be taken into account with respect to the magnitude of the pre-charge pressure level which is to be built up. In any case, the ambient temperature and/or the actual temperature of the brake fluid can therefore be used as a third triggering factor for the buildup of the pre-charge pressure.

At this point it will generally be clarified that the possible braking process which is to be detected can be implemented in a variety of ways. Reference is made here, in particular, to the possibility of a manual deceleration request and/or a deceleration request based on an autonomous decision of a vehicle system. In this way, the advantages achieved based on the present disclosure can be realized by all forms of deceleration requests with respect to the sources and/or triggers thereof.

With respect to the third triggering factor which is described above (automatic parking and low ambient temperature), the implementation which subsequently occurs can be such that when it is present the brake system is placed at a specific pressure level. This pressure level, which can also be referred to as pre-charge pressure, can be achieved in that the buildup of pressure extends as far as the wheel brake. In other words, in this context at least a portion of the pre-charge pressure is passed on to the wheel brake during the building up of the pre-charge pressure. In this way, at least slight pre-stressing of the brake system is achieved in order to counteract the relatively high viscosity of the brake fluid. In this context, the respective magnitude of the pre-charge pressure level may depend, for example, on the type of brake fluid and/or the ambient temperature.

In accordance with one aspect of the disclosure, the buildup of the pre-charge pressure can take place in two stages. This means that the pre-charge pressure can, for example, first reach an initial level and subsequently rise, for example, to an ultimate level. Such a pressure buildup in two stages is considered to be advantageous, in particular in conjunction with the first and/or second triggering factor. This is due to the fact that the vehicle may be moving at significantly higher speeds during these triggers than in the case of automatic parking. In this respect it is to be assumed that the required pre-charge pressure is correspondingly higher when the vehicle is moving faster in order to achieve a sufficient braking effect.

In accordance with the present teachings, when an initial level of the pre-charge pressure is built up on the basis of the first triggering factor and/or the second triggering factor, the pre-charge pressure can be passed directly to the at least one wheel brake during the buildup of the pre-charge pressure. As a result, for example, the brake pads or brake calipers can be moved as close as possible to the brake component to which they correspond. The brake components may be, for example, a brake disk or a brake drum. As a result, the possibly increased viscosity of the brake fluid such as can occur at low ambient temperatures can, as it were, also be compensated for.

The present disclosure also provides that the brake system which is to be operated in this way comprises a valve device which is connected upstream of at least one wheel brake.

Such a valve device may be a type of shut-off valve or preferably a type of proportional valve, in particular a pressure feed valve and/or "TMC cut valve". Some of these valve devices have the advantage that the brake fluid can possibly pass through in a stepless manner. In each case the valve device should be suitable for passing on the pressure present at its inlet at a desired level to its output and therefore to the wheel brake.

In this context, the disclosure provides that when the initial level of the pre-charge pressure is reached, the valve device is closed. In this way, the already built-up initial pre-charge pressure extends as far as the wheel brake, wherein a further increase in the pressure owing to the then closed valve device is initially not passed on. The initial pre-charge pressure can, for example, be up to about 0.3 bar, and the valve device can be closed when the initial pre-charge pressure of about 0.3 bar is reached. The system pre-charge pressure can subsequently be raised further, for example as far as about 10.0 bar, and thus, to its ultimate pre-charge level, when the valve device is closed. In this way, a sufficient pre-stress is available in the brake system, which pre-stress can then, where necessary, be passed on at least partially directly to the at least one wheel brake. For this purpose, when the pre-charge pressure is present the valve device can be at least partially opened during the braking process.

In this way, the pre-stress which is built up on the basis of the first and/or second triggering factor can, in some cases, be loaded into the brake system a long time before a possible braking maneuver, such that the pre-charge pressure in the brake system is then available virtually immediately when necessary in the event of deceleration. At this point, it is to be basically noted that with respect to the disclosure the term pre-charge pressure which is used is to be understood both as meaning the initial pre-charge pressure as well as the ultimate pre-charge pressure. In other words, the term pre-charge pressure is here a global term for the initial and ultimate levels thereof.

Pre-charge pressures which are already generated today by means of electronic stability program (ESP) provide pre-filling of approximately 3.0 bar to the wheel brake. However, the building up of such a high pre-charge pressure, which extends directly to the wheel brake, involves usually disruptive sound effects. In addition, a pre-charge pressure of about 2.0 bar to about 3.0 bar directly at the wheel brake brings about a deceleration which is perceived as pitching or rearing up of the vehicle as a result of its dipping into and/or lifting out of the spring elements. In contrast, the method of the present disclosure provides significantly lower values for the initial pre-charge pressure which is to be built up. These lower initial pre-charge pressures do not have the same disadvantages, namely, the lower pressures do not bring about a deceleration which is perceived as pitching or rearing up of the vehicle. The ultimate pre-charge pressure, which is relevant for the sufficient braking power during the imminent braking maneuver, is selected to be significantly higher. However, the buildup of the ultimate pre-charge pressure occurs when the valve device is closed, with the result that the ultimate pre-charge buildup initially does not generate any perceptible effects on the wheels and instead advantageously provides a high preventive pre-stress in the brake system, which can be called upon immediately when required.

With respect to the buildup of the pre-charge pressure on the basis of the third triggering factor (automatic parking and low ambient temperature), the valve device preferably remains open over the entire duration of the buildup of pressure, with the result that the pre-charge pressure is already present at the at least one wheel brake during the building up of the pre-charge pressure.

Further advantageous developments of the basic premise of the present disclosure include the possible dependency of the respective level of the pre-charge pressure, to be more precise the initial pre-charge pressure and the ultimate pre-charge pressure, on any factors. Additionally or alternatively to this, the disclosure provides such a dependence also for the respective time period over which the pre-charge pressure is maintained. There can also be possible dependences on, for example, relevant external conditions.

For example, according to one exemplary embodiment, the method takes into account use of the vehicle-side windshield wiper device. The vehicle-side windshield wiper device generally comprises a windshield wiper which serves to clean the windshield in combination with wiping water or to remove water, such as for example rainwater, which is situated on a part of the windshield of the vehicle. In particular, the last variant is to be interpreted as an indication that the underlying surface to be traveled on is possibly wet with rainwater. This information can consequently be used to adapt the level of the pre-charge pressure, such as for example the ultimate pre-charge pressure, to the respective road conditions. In the case of rainy weather it is therefore possible to assume a usually reduced grip of the wheels on the underlying surface, with the result that a high braking effect which is present within a short time can easily lead to locking of the wheel which is decelerated in this way. In contrast to dry weather situations (windshield wiper off or only briefly active in combination with wiping water), the level of the respective pre-charge pressure can turn out to be lower in order to correspondingly take into account the likelihood of normal grip of the wheels on the underlying surface.

In this context, it is also possible to take into account the possible setting into operation of the windshield wiper device. In particular, the speed of the active windshield wiper which, for example, can take place quickly or slowly, is of interest here. Information about the possible conditions of the underlying surface can also easily be derived therefrom. Accordingly, rapid operation of the wiper can permit a more slippery underlying surface to be inferred than in the case of only slow wiper operation. The objective is to achieve a braking performance of the system which is adapted in an ideal way. For this purpose, the length of the time period up to the maintenance and/or buildup of the respective pre-charge pressure may be kept variable and can be adjusted as a function of the triggering factors. This applies correspondingly to the respective value of the suitable pre-charge pressure. The preferably automatic setting of the respective values with respect to necessary predefinitions is the responsibility of the person skilled in the art. This can be performed by him, for example, on the basis of the vehicle and further individual embodiments.

The previously described setting possibility can also take place on the basis of the respective ambient temperature. In this context, for example, different hardnesses of the vehicle tires can also be taken into account as a function of the ambient temperature. It is also conceivable here to use the detected power system voltage of the vehicle. The respectively present power system voltage can have effects on whether and/or to what extent the available support takes place without adversely influencing and/or disrupting other devices and functions of the vehicle. In the case of a power system voltage which is in a low range it can therefore be possible to use the function or not. For example, in the case of a power system voltage of 6.0 volts it can be possible that the function is not available. In contrast, in the case of a power system voltage of 13.0 volts there should be optimum performance of the function.

The present disclosure also provides that the setting can also take place on the basis of other potentially adverse circumstances which are detected, for example, by means of optical systems which are already present or which are to be specially arranged in the vehicle. In this context, circumstances which can adversely affect the braking behavior of the vehicle in relation to the respective underlying surface could be taken into account. It is therefore conceivable, for example, to detect an underlying surface in poor condition, which could provide information about the underlying surface which is still to be traveled on. Poor underlying surface conditions such as, for example, uneven areas ranging up to the differentiation of metal or non-metal sections could also therefore be input into the setting of the pre-stressing times and the pre-stressing pressures. Such measures advantageously contribute to developing the method of operation of the brake system in accordance with the present disclosure, increasing driver comfort and stability of the vehicle.

Factors for the setting possibilities which are based on the respective transmission ratio and/or the yaw rate of the vehicle can also be used. Of course, the function described here also can be limited to the fact that it is only available when a specific value of the speed of the vehicle is exceeded. This value can be different depending on the respective activation conditions for the buildup of the pre-charge pressure. It is conceivable here, for example, to take into account the speed of the vehicle during the automatic parking (third triggering factor) only to a small extent, or not to take it into account at all. In contrast, the function can be tied, in combination with the first and/or second triggering factor, to the fact that the function is only available starting from a speed of, for example, 90 km/h. The availability of the function can also be limited to a range of, for example, 90 km/h to 120 km/h.

While taking into account the time periods mentioned above, the disclosure may provide the following measures:

As soon as the condition for the first triggering factor is met, the function could start with the use of the electric motor. The electric motor could build up over an initial pre-charging time, for example with a slow rotation, the initial pre-charge pressure which directly reaches the wheel brake. The initial pre-charge pressure could be maintained here, for example, over an initial pre-stressing time period of up to about 5.0 seconds. The initial pre-charge pressure could have here a value of, for example, up to about 0.3 bar. If the value which can basically preferably be set for the initial pre-charge pressure is reached, the function forcibly brings about the closing of the valve device. When the valve device is closed, the function then continues to use the electric motor to build up the ultimate pre-charge pressure which can basically preferably be set and which can be, for example, up to about 10.0 bar. When reached, the ultimate pre-charge pressure can then be maintained, for example, over a longer pre-stressing time period which can be up to about an additional 5.0 seconds.

If the activation of the brake pedal and therefore the driver-side active deceleration request is detected within the specified pre-stressing time periods, the brake system could begin to make available the requested deceleration level.

If the brake pedal is not activated and the pre-stress in the brake system has the ultimate pre-charge pressure and the longer pre-stressing time period is exceeded, the function could then start again with the lowering of the pre-charge pressure. This lowering could occur, for example, up to the initial pre-charge pressure level. If there continues to be no activation of the brake pedal, the function can start from this point at a cycle of the pressure buildup which builds up to the ultimate pre-charge pressure again and maintains it over the longer pre-stressing time period.

Of course, the brake pedal which is used for the previous description can be made available by another brake device.

With respect to the second triggering factor, when it is present the function could start with the pressure buildup as previously described for the first triggering factor. However, in this context other values can be provided for the respective pre-charge pressure and the respective pre-stressing time periods. It is therefore possible for the pre-charge pressures and pre-stressing time periods to be adapted, for example, as a function of triggering factors such as, for example, an available collision warning and the general availability of an autonomous braking process by the vehicle. As a result, the performance capability of the brake system can be further advantageously adapted to the respective conditions.

For the measures described above, the disclosure provides a number of basic possibilities of development, as explained below:

Therefore, the counter for the respective pre-stressing time period can be reset during the buildup of the pre-charge pressure, to be more precise when the function is active, for example when there is active actuation of the brake pedal or of the accelerator pedal and there is an autonomous deceleration request. In other words, as a result any deceleration process starts the buildup of the pre-charge pressure from a zero time.

In order to prevent possible ongoing operation of the function in all its available operating modes, the function can be reset, for example, after a defined time of its subsequent operation. In this context, the respective level of the pre-charge pressure which is possibly present would then be reduced further.

The availability of the function can also vary on the basis of the system voltage and/or the ambient temperature to the extent that the individual modes are available over different temperature ranges and/or voltage ranges. It is therefore possible, for example, for the automatic parking operation to be available at temperatures below those of the driver-side deceleration request operation (first triggering factor).

Furthermore, the availability of the respective operating mode can also be set on the basis of the error status of available sensor elements or other vehicle modules. It is therefore possible to set the conditions for the availability of the corresponding mode in the case of an autonomous deceleration request (second triggering factor) in such a way that if a detection device for forward directed collision warning is in a faulty status, the mode for a driver-side deceleration request remains available and active in any case. As a result, the individual modes can advantageously be used also to continue to make available a shortening of the reaction time by corresponding safety means. In this way, for example the failure of a vehicle-side system can as a result be compensated at least partially in its possible effects.

Generally, the respective operating mode should be available irrespective of any steering inputs by the person controlling the vehicle or by an autonomous control source. However, possible interventions of a stability control or anti-lock function can lead to resetting of the function.

Overall, the inventive buildup of the pre-stress also permits a better performance of vehicle-side ESP and/or RSC modules (Roll Stability Control). This is the case in particular also at low ambient temperatures. In any case, the function now presented brings about a significant improvement in performance with respect to braking maneuvers which are carried out by the person controlling the vehicle or by autonomous interventions. In addition, the conditions for carrying out automatic parking, in particular at low ambient temperatures, are also improved significantly.

Turning now to the drawings, a flowchart illustrating a method of operating the brake system 100 based on driver deceleration is shown in FIG. 1. As shown in FIG. 1, a determination of the presence of a driver deceleration trigger, such as calculation of a quick release of the acceleration pedal, is made at step 110. At step 120, the pre-charge pressure is set or selected based on the trigger, i.e., based on the presence of the driver deceleration trigger factor. Once the pre-charge pressure is selected, an initial portion of the pre-charge pressure is passed to the wheel brake(s) as it builds at step 130, the pre-charge pressure can be passed directly to the at least one wheel brake during the buildup of the pre-charge pressure, moving the brake pads or brake calipers close to the brake component to which they correspond. After the initial portion of the pre-charge pressure is passed to the wheel brake(s), the valve(s) to the wheel brake(s) are closed at step 140. The pre-charge pressure continues to build in the brake system (step 150) until the ultimate (or secondary) pre-charge pressure is built up. During the buildup of the ultimate or secondary pressure, a driver deceleration request (step 160) will cause the valves to open and the pre-charge pressure to be directed to the wheel brakes (step 170). A similar request (step 160) after the buildup of the ultimate or secondary pressure also will cause the valves to open and the pre-charge pressure to be directed to the wheel brakes (step 170). The ultimate or secondary pre-charge pressure is maintained after buildup, until a driver deceleration request is received, or a time period for maintaining the ultimate or secondary pre-charge pressure expires (step 180). If no request is received and the time period for maintaining the ultimate or secondary pre-charge pressure expires, then the ultimate or secondary pre-charge pressure is released in the brake system. (step 190) and the method begins again.

Figure 2:
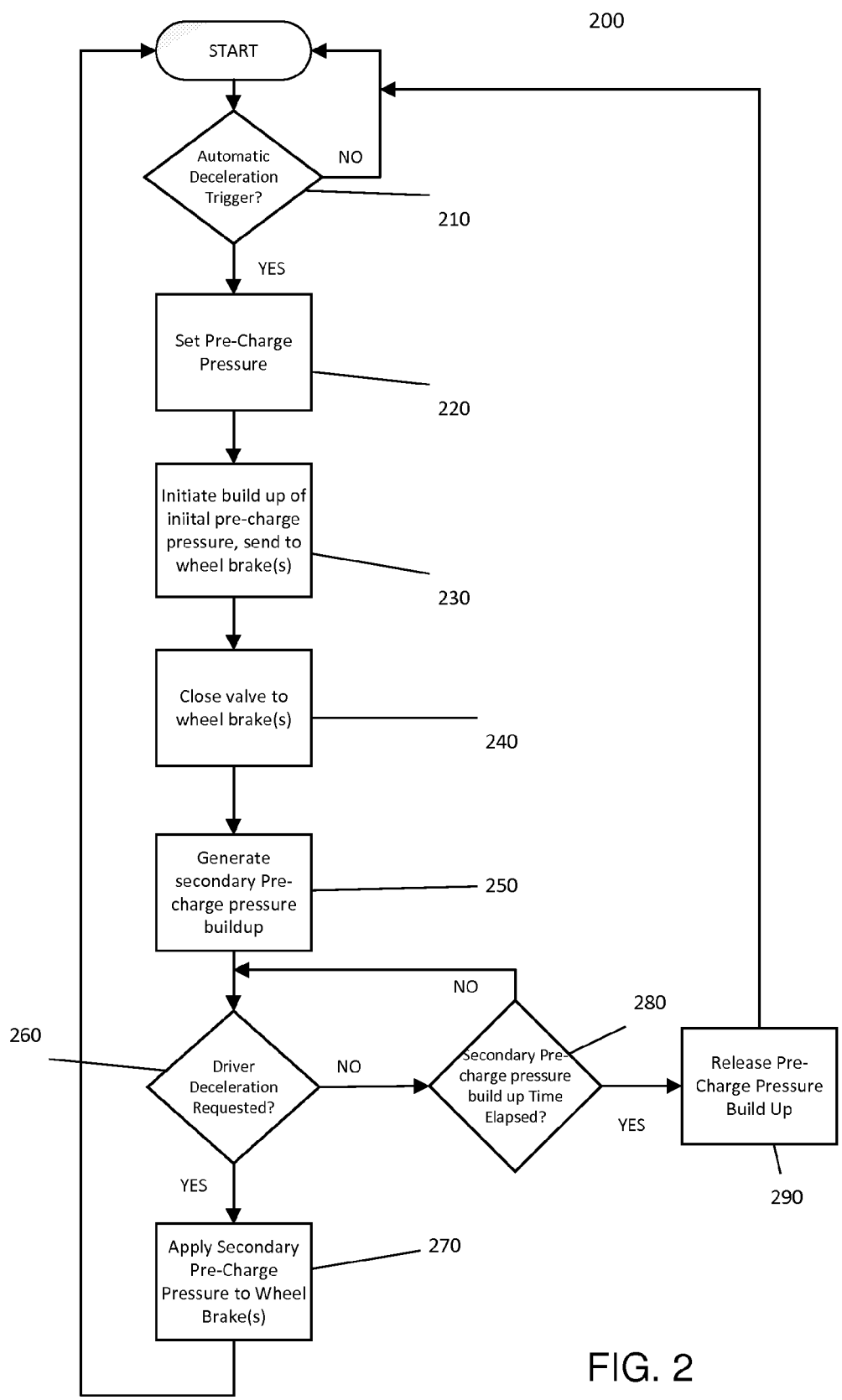
FIG. 2 is a flowchart illustrating a second exemplary embodiment of a method of operating a brake system in accordance with the present disclosure.

FIG. 2 provides a flowchart illustrating a method of operating the brake system 200 based on automatically requested deceleration (collision mitigation/avoidance). As shown in FIG. 2, a determination of the presence of an automatic deceleration trigger, such as detection of an object by a detection system of a collision warning system, is made at step 210. At step 220, the pre-charge pressure is set or selected based on the trigger, i.e., based on the presence of the automatic deceleration trigger factor. Once the pre-charge pressure is selected, an initial portion of the pre-charge pressure is passed to the wheel brake(s) as it builds at step 230, the pre-charge pressure can be passed directly to the at least one wheel brake during the buildup of the pre-charge pressure, moving the brake pads or brake calipers close to the brake component to which they correspond. After the initial portion of the pre-charge pressure is passed to the wheel brake(s), the valve(s) to the wheel brake(s) are closed at step 240. The pre-charge pressure continues to build in the brake system (step 250) until the ultimate (or secondary) pre-charge pressure is built up. During the buildup of the ultimate or secondary pressure, a driver deceleration request (step 260) will cause the valves to open and the pre-charge pressure to be directed to the wheel brakes (step 270). A similar request (step 260) after the buildup of the ultimate or secondary pressure also will cause the valves to open and the pre-charge pressure to be directed to the wheel brakes (step 270). The ultimate or secondary pre-charge pressure is maintained after buildup, until a driver deceleration request is received, or a time period for maintaining the ultimate or secondary pre-charge pressure expires (step 280). If no request is received and the time period for maintaining the ultimate or secondary pre-charge pressure expires, then the ultimate or secondary pre-charge pressure is released in the brake system. (step 290) and the method begins again.

Figure 3:
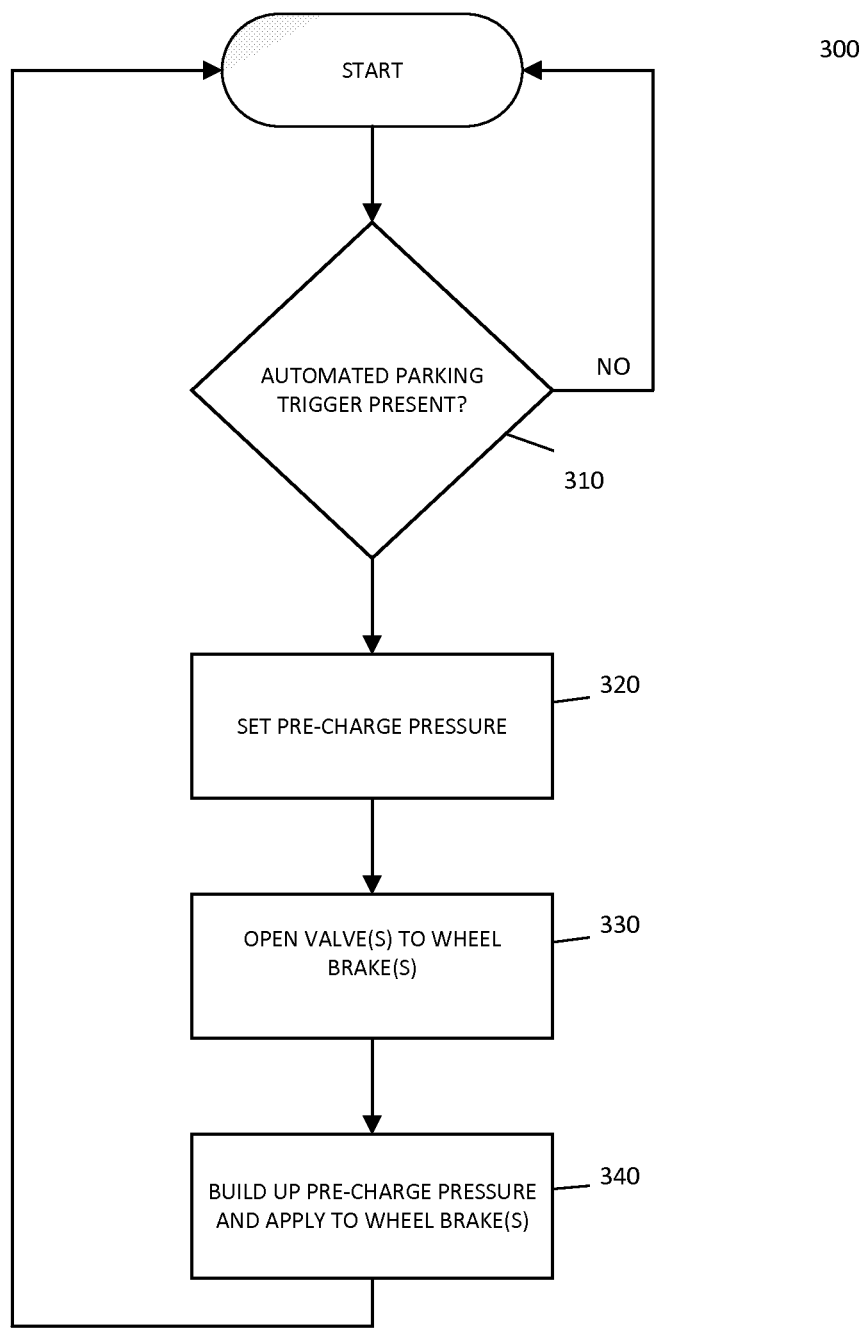
FIG. 3 is a flowchart illustrating a third exemplary embodiment of a method of operating a brake system triggered by an automated parking event.

FIG. 3 provides a flowchart illustrating a method of operating the brake system 300 based on an automated parking trigger. As shown in FIG. 3, a determination of the presence of an automatic parking trigger, such as detection of a request for automatic parking when the ambient temperature is low, is made at step 310. At step 320, the pre-charge pressure is set or selected based on the trigger, i.e., based on the presence of the a request for automatic parking at a low ambient temperature. The pre-charge pressure may be set, for example, based on the ambient temperature. At step 330, the valves to the wheel brakes are opened (if not already opened) and the pre-charge pressure is built up (step 340) and applied directly to the wheel brakes via the open valves.

The methods described above can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for operating an electromechanical vehicle brake system, comprising:
    in advance of a braking request, determining that an activation condition has been met;
    selecting a pre-charge pressure based at least in part on the activation condition;
    building up at least an initial portion of the pre-charge pressure in the brake system; and
    applying at least the initial portion of the pre-charge pressure to at least one wheel brake.

2. The method as claimed in claim 1, wherein determining that an activation condition has been met includes calculating a rate of release of an accelerator pedal.

3. The method as claimed in claim 1, wherein determining that an activation condition has been met includes receiving a signal indicative of a detected object.

4. The method as claimed in claim 3, wherein receiving a signal indicative of a detected object includes receiving a signal from a collision warning device of the vehicle.

5. The method as claimed in claim 1, wherein determining that an activation condition has been met includes receiving an instruction to initiate an automatic parking process.

6. A method for operating an electromechanical vehicle brake system, comprising:
    determining that an activation condition has been met;
    selecting a pre-charge pressure based at least in part on the activation condition;
    building up at least an initial portion of the pre-charge pressure in the brake system;
    applying at least the initial portion of the pre-charge pressure to at least one wheel brake; and
    providing a remaining portion of the pre-charge pressure to the wheel brakes upon receipt of a braking request.

7. The method as claimed in claim 6, wherein the braking request is a manual deceleration request or an autonomous deceleration request.

8. The method as claimed in claim 6, wherein building up at least an initial portion of the pre-charge pressure includes building up an entirety of the selected pre-charge pressure, and wherein applying at least the initial portion of the pre-charge pressure to the wheel brakes includes passing substantially all of the pre-charge pressure on to the wheel brake during the buildup of said pre-charge pressure.

9. A method for operating an electromechanical vehicle brake system, comprising:
    determining that an activation condition has been met;
    selecting a pre-charge pressure based at least in part on the activation condition;
    building up at least an initial portion of the pre-charge pressure in the brake system;
    applying at least the initial portion of the pre-charge pressure to at least one wheel brake; and
    building up a secondary portion of the pre-charge pressure after applying the initial portion of the pre-charge pressure to the wheel brakes.

10. The method as claimed in claim 9, further comprising closing a valve device which is arranged upstream of the wheel brake prior to building up the secondary portion of the pre-charge pressure.

11. The method as claimed in claim 3, further comprising building up a secondary pre-charge pressure after applying the initial portion of the pre-charge pressure to the wheel brakes.

12. The method as claimed in claim 11, further comprising closing a valve device which is arranged upstream of the wheel brake prior to building up the secondary portion of the pre-charge pressure.

13. The method as claimed in claim 10, further comprising maintaining at least one of the initial portion of the pre-charge pressure and the secondary portion of the pre-charge pressure in the brake system for a period of time, wherein the respective level of the pre-charge pressure and/or the period of time for the maintenance of the pre-charge pressure is calculated as a function of an external condition and/or the activity of a windshield wiper device of the vehicle.

14. The method as claimed in claim 13, further comprising reducing the pre-charge pressure in the brake system when the period of time for the maintenance of the pre-charge pressure expires.

15. The method as claimed in claim 10, further comprising maintaining at least one of the initial portion of the pre-charge pressure and the secondary portion of the pre-charge pressure in the brake system for a period of time, wherein the respective level of the pre-charge pressure and/or the period of time for the maintenance of the pre-charge pressure is calculated as a function of an external condition and/or the activity of a windshield wiper device of the vehicle.

16. The method as claimed in claim 15, further comprising reducing the pre-charge pressure in the brake system when the period of time for the maintenance of the pre-charge pressure expires.

17. The method as claimed in claim 1, further comprising providing a remaining portion of the pre-charge pressure to the wheel brakes upon receipt of a braking request.

18. The method of claim 17, wherein the braking request is a manual deceleration request or an autonomous deceleration request.

19. The method of claim 1, wherein building up at least an initial portion of the pre-charge pressure includes building up an entirety of the selected pre-charge pressure, and wherein applying at least the initial portion of the pre-charge pressure to the wheel brakes includes passing substantially all of the pre-charge pressure on to the wheel brake during the buildup of said pre-charge pressure.

20. The method of claim 19, further comprising maintaining at least one of the initial portion of the pre-charge pressure and the secondary portion of the pre-charge pressure in the brake system for a period of time, wherein the respective level of the pre-charge pressure and/or the period of time for the maintenance of the pre-charge pressure is calculated as a function of an external condition and/or the activity of a windshield wiper device of the vehicle.

21. The method of claim 20, further comprising reducing the pre-charge pressure in the brake system when the period of time for the maintenance of the pre-charge pressure expires.

22. The method as claimed in claim 1, further comprising building up a secondary pre-charge pressure after applying the initial portion of the pre-charge pressure to the wheel brakes.

23. The method of claim 22, further comprising closing a valve device which is arranged upstream of the wheel brake prior to building up the secondary portion of the pre-charge pressure.

24. The method of claim 6, wherein determining that an activation condition has been met comprises at least one of calculating a release rate of an accelerator pedal, receiving a signal indicative of a detected object, and receiving an instruction to initiate an automatic parking process.

25. The method of claim 24, wherein receiving a signal indicative of a detected object comprises receiving a signal from a collision warning device of the vehicle.

26. The method of claim 9, wherein determining that an activation condition has been met comprises at least one of calculating a release rate of an accelerator pedal, receiving a signal indicative of a detected object, and receiving an instruction to initiate an automatic parking process.

27. The method of claim 26, wherein receiving a signal indicative of a detected object comprises receiving a signal from a collision warning device of the vehicle.

28. An electromechanical vehicle brake system, comprising:
   a controller configured to:
      in advance of a braking request, determine that an activation condition has been met;
      select a pre-charge pressure based at least in part on the activation condition;
      build up at least an initial portion of the pre-charge pressure in the brake system; and
      apply at least the initial portion of the pre-charge pressure to at least one wheel brake.

29. The electromechanical vehicle brake system of claim 28, wherein the controller is further configured to provide a remaining portion of the pre-charge pressure to the wheel brakes upon receipt of a braking request.

30. The electromechanical vehicle brake system of claim 28, wherein the controller is further configured to build up a secondary portion of the pre-charge pressure after applying the initial portion of the pre-charge pressure to the wheel brakes.

* * * * *